US010935712B2

(12) United States Patent
Toraille et al.

(10) Patent No.: US 10,935,712 B2
(45) Date of Patent: Mar. 2, 2021

(54) DISPLAY LIGHTING DEVICE WITH LIGHT GUIDE EDGELIT BY LEDS COUPLED TO TRIANGULAR PRISM (71) Applicant: THALES, Courbevoie (FR)

(72) Inventors: Vincent Toraille, Moirans (FR); Hugues Lebrun, Coublevie (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/685,489

(22) Filed: Nov. 15, 2019

(65) Prior Publication Data
US 2020/0158941 A1 May 21, 2020

(30) Foreign Application Priority Data

Nov. 15, 2018 (FR) ...................... 1871851

(51) Int. Cl.
G02F 1/1333 (2006.01)
F21V 8/00 (2006.01)
(52) U.S. Cl.
CPC ......... *G02B 6/0031* (2013.01); *G02B 6/0026* (2013.01); *G02B 6/0068* (2013.01)
(58) Field of Classification Search
CPC ... G02F 2001/133626; G02F 1/133615; F21Y 2113/10; F21Y 2113/13
See application file for complete search history.

(56) References Cited

U.S. PATENT DOCUMENTS

| | | | |
|---|---|---|---|
| 5,442,522 A | 8/1995 | Kalmanash | |
| 6,574,030 B1 | 6/2003 | Mosier | |
| 7,014,349 B2 * | 3/2006 | Shinohara | G02B 6/0016 362/561 |
| 7,018,085 B2 * | 3/2006 | Lee | G02B 6/0028 349/65 |
| 7,488,103 B2 * | 2/2009 | Watanabe | G02B 6/0031 362/607 |
| 7,791,684 B2 * | 9/2010 | Teijido | G02B 6/0023 349/65 |
| 7,924,371 B1 | 4/2011 | Davis | |

(Continued)

FOREIGN PATENT DOCUMENTS

| | | |
|---|---|---|
| EP | 0 560 614 A1 | 9/1993 |
| FR | 2 562 697 A1 | 10/1985 |
| WO | 2016/030217 A1 | 3/2016 |

*Primary Examiner* — Ismael Negron (74) *Attorney, Agent, or Firm* — BakerHostetler (57) ABSTRACT

A device for backlighting a display in day- or night-vision mode includes a light guide with a cuboid shape and having an output face, and a lateral input prism having three rectangular lateral faces, at least one of the rectangular lateral faces being optically coupled to the lateral input face, and another of the rectangular lateral faces being semi-reflective; a first plurality of light emitting diodes arranged on a first carrier and configured to emit light in a first direction orthogonal to the first carrier towards one of the rectangular lateral faces; a second plurality of light emitting diodes arranged on a second carrier and configured to emit light in a second direction orthogonal to the second carrier towards another of the rectangular lateral faces; and an optical filter configured to modify the light emitted by one of the first and second plurality of light emitting diodes suitable for use in night-vision equipment.

14 Claims, 3 Drawing Sheets

(56) References Cited

U.S. PATENT DOCUMENTS

| | | | |
|---|---|---|---|
| 8,052,316 B2* | 11/2011 | Lee | G02B 6/0048 |
| | | | 362/610 |
| 8,398,287 B2* | 3/2013 | Pance | F21S 10/005 |
| | | | 362/606 |
| 8,628,206 B1 | 1/2014 | Davis et al. | |
| 2005/0248734 A1 | 11/2005 | Chung et al. | |
| 2007/0058392 A1 | 3/2007 | Watanabe et al. | |
| 2008/0239203 A1 | 10/2008 | Teijido et al. | |
| 2012/0230050 A1 | 9/2012 | Kim et al. | |
| 2013/0322114 A1 | 12/2013 | Nishitani et al. | |
| 2020/0158940 A1* | 5/2020 | Toraille | G02B 6/0026 |

* cited by examiner

100
DISPLAY LIGHTING DEVICE WITH LIGHT GUIDE EDGELIT BY LEDS COUPLED TO TRIANGULAR PRISM

CROSS-REFERENCE TO RELATED APPLICATIONS

This application claims priority to foreign French patent application No. FR 1871851, filed on Nov. 15, 2018, the disclosure of which is incorporated by reference in its entirety.

FIELD OF THE INVENTION

The invention relates to a light-emitting-diode-based lighting device for flat liquid-crystal matrix-array (hereinafter "LC matrix array") viewing screens, which provides two modes for backlighting the LC matrix array, one suitable for using (viewing) the screen by day and the other suitable for nighttime use that is compatible with "NVIS" (night-vision imaging system) equipment such as for example light-amplifying night-vision goggles (NVGs). The invention applies in particular to viewing devices, including head-up displays (HUDs), used in aircraft cockpits.

BACKGROUND

The two, daytime and nighttime, LC-matrix-array backlighting modes each have their own issues. If, in both cases, a good level of backlighting uniformity (i.e. illumination of the entire LC-matrix-array back surface) is sought, since this determines the optical quality of the image, for the daytime mode, there is a need for a white light with very high luminosity in order to provide sufficient contrast with respect to the very high luminosity that, by day, is found inside the cockpit of an aircraft; conversely, for the nighttime mode, little luminous power is needed, but the emission spectrum must be outside the infrared or near-infrared band in order to be compatible with viewing the screen through NVIS equipment such as NVGs.

In the most modern technologies, the light sources are based on light-emitting diodes. The daytime source may thus comprise a set of white light-emitting diodes, or else arrangements of diodes that emit in different colours, for example arrangements of RGB (red, green, blue) diodes, which generally allows better colorimetry to be achieved. The number of diodes used depends on the space available and on the power of the diodes to meet the requirement in terms of luminous power and to best provide uniformity of illumination over the entire back face of the LC matrix array. The nighttime source may use a light source designed to emit in the admissible spectrum. Another known embodiment uses one or more white diodes that are individually or collectively associated with a special filter, known as an "NVIS" filter, which allows the infrared and near-infrared radiation to be filtered out in order to provide, at output, radiation whose spectrum is compatible with the use of NVIS equipment. It is also possible to use arrangements of RGB diodes with an NVIS filter associated with the red diodes.

The invention is more particularly described hereinafter in the context of light-emitting-diode-based light sources, which may be white or coloured, with a suitable NVIS filter for the nighttime source, but the solution of the invention could be applied to other commonly used sources, such as fluorescent or incandescent lights.

The invention relates more particularly to lighting device architectures using one and the same prismatic light guide to diffuse the light delivered by the two backlighting sources, i.e. the "daytime" light source and the "nighttime" light source.

A prismatic light guide generally takes the shape of a transparent (optically transparent) cuboid plate of low thickness (thin layer) arranged beneath (behind) the LC matrix array of the screen, and the light delivered by each of the two backlighting sources is transmitted from the lower face of the guide to be diffused by the upper face of the guide arranged below the plane of the LC matrix array. A corresponding architecture is for example described in applications U.S. Pat. No. 8,628,206 or 7,924,371. There is then a physical intermingling of the daytime and nighttime diodes behind the guide, which is not optimal in terms of daytime-diode density since the nighttime diodes demand greater spacing due to their individual NVIS filtering covers. This configuration is not optimal in terms of bulk either, since to ensure a properly uniform diffusion of light at the output of the prism, the carrier circuit board for the diodes must be placed in a plane that is set quite far back from the guide, the distance by which it is set back increasing with decreasing diode density.

Application EP 0 560 614 proposes another architecture which uses edge lighting for night vision: the diodes of the nighttime light source are placed on an edge of the plate. A gain is made in terms of bulk with respect to the preceding architecture: since the spacing of the daytime diodes is less restricted (there is no longer a need to take the bulk of the nighttime diodes into account), the density of the daytime-diode sheet may be increased. However, the setback distance remains around 10 times the thickness of the light guide. For example, with a prismatic light guide a few millimetres thick, the setback distance of the daytime sheet with respect to the back face of the guide will be around 4 to 5 cm.

Moreover, if a standard light guide is used, the diffusion of nighttime light by the diffusing upper face of the guide is not very uniform: nearly all of the light is extracted at the input of the guide. To improve this, the light must be extracted gradually along the entire length of the guide. Guides with an extraction gradient are known, this being achieved for example by using microstructures whose spacing varies along the length of the guide or by varying the thickness of the guide longitudinally (corresponding to the lateral injection direction). However this gradient must be compensated for on the daytime path in order to retain uniform diffusion on the daytime path. This may be achieved using a technique referred to as "local dimming", in which the intensity of current delivered to each diode is adjusted according to its position on the longitudinal light-injection axis. This solution is quite expensive because electronics for controlling each diode of the daytime light source at least must be included, along with a corresponding calibration step, for a given product or application.

To improve compactness, application WO2016/030217 proposes arranging the daytime lighting diodes in one or more rows along a lateral face of the guide (input face) and envisages incorporating a light guide specifically for the nighttime path, in the form of a thin layer, between this input face and the row of daytime diodes. The function of this specific guide is to extract the light coming from a nighttime lighting diode (with filter) which is injected via a lateral face of this specific guide and which exits therefrom via a plurality of diffusing faces of this guide which are arranged level with and between the daytime lighting diodes. In other words, the technical effect of this specific light guide is to create point sources for diffusion of the nighttime lighting which are scattered among or between the daytime diodes, allowing the light from these "nighttime" point sources to be injected via the same input face of the main light guide as the daytime diodes. In so doing, the problems with physically intermingling the positions of the daytime diodes and the nighttime-diffusion point sources created by the specific guide are at least partly encountered again. In particular, due to the intermingling of the diffusing faces of the specific guide and of the daytime diodes, the design and placement of this specific guide with respect to the daytime lighting diodes is difficult if it is desired to achieve good uniformity of light diffusion for both modes and sufficient power in daytime mode.

SUMMARY OF THE INVENTION

A lighting device according to the invention does not have the various drawbacks of the prior art. More specifically, what is proposed in the invention is an architecture that is based on a light guide, the shape of which is made up of two right prisms end-to-end in a longitudinal direction: a main right prism which is a cuboid plate, which corresponds to the typical shape of a prismatic light guide for an LC matrix array, with a face corresponding to a base of the cuboid which forms the light-output surface (via which the light is extracted and diffused in the direction of the back face of the LC matrix array), and a lateral face in a plane orthogonal to the base, which forms a main light input for both light sources; and an auxiliary right prism in the continuation of this lateral input face, which is a right prism, the base of which takes the general shape of an isosceles right triangle, and the three rectangular lateral faces of which are used, one as light-output face for the input stage, the rectangular dimensions of which are the same as those of the main-input face, against which it is placed or with which it is coincident, and the two other lateral faces as light-input faces, each for one respective light source and at least one of which is semi-reflective.

The expression "general shape of an isosceles right triangle" (or that used further on in the description, "right prism, the base of which is an isosceles right triangle") is understood to mean that, in the invention, angular variations of around a few degrees are possible in practice, such that the triangle is no longer strictly an isosceles right triangle in order to allow the reflective characteristics of the prism to be optimized with a view to obtaining the most uniform distribution of light possible over the main input face of the plate, whichever vision mode is active.

Lastly, is would be appropriate to recall the definition of a right prism and of the associated terms used in the present description: a solid having two superposed, identical and parallel polygonal faces, which are generally referred to as "bases", the number of rectangular lateral faces being the same as the number of vertices of the base polygon. Thus, a right rectangular prism corresponds to a cuboid and includes four rectangular lateral faces. A right triangular prism includes three rectangular lateral faces. In other words, a lateral face or a base of the prism is an input face or an output face for light, meaning that it transmits or diffuses light from the exterior into the interior of the prism for the first and from the interior out to the exterior for the second, after possible reflection off the other faces or the other base of the prism.

This having been specified, the invention relates to a lighting device that is compatible with night-vision equipment, which includes at least:

a first light source configured for a day-vision mode, formed of at least one row of aligned light-emitting diodes emitting in a direction orthogonal to a source-carrier plane;

a second light source configured for a night-vision mode, formed of at least one row of aligned light-emitting diodes emitting in a direction orthogonal to a source-carrier plane, with an optical filter suitable for making the light emitted by said second source compatible with the use of night-vision equipment; and a light guide configured to diffuse, via a main output face, the light delivered by the first or the second light source depending on which, day- or night-, vision mode is active, the light guide comprising a main right-prism shape with rectangular bottom and top bases forming a cuboid plate, the top base of said plate forming the main output face of the light guide; and the assembly of the light guide together with the first and the second light sources being such that the light emitted by each of the sources is injected into said main cuboid-plate shape via a lateral face of said plate, the lighting device being characterized in that the lateral face for injection of light into said main cuboid plate of the guide is the same for the first and the second light sources; and the shape of the light guide is made up of two right-prism shapes end-to-end in a longitudinal direction with respect to the guide, comprising said main cuboid-plate shape and an auxiliary right-prism shape, the base of which is an isosceles right triangle defining, by construction, three rectangular lateral faces, two lateral faces of which are at right angles, where:

a first lateral face is a face for light output from said auxiliary prism, said output face having the same rectangular dimensions as the lateral injection face of the main plate to which it is bonded or with which it is coincident; and a second lateral face is a first face for light input for one light source from the first and the second light sources into the interior of said auxiliary right prism in the direction of another lateral face of the auxiliary prism;

a third lateral face is a second face for light input for the other light source into the interior of said auxiliary prism in the direction of said first input face; and at least the first input face is semi-reflective, allowing reflection of the light transmitted via said second input face in the direction of said output face.

According to one aspect of the invention, the two lateral faces at right angles correspond to the first input face and the second input face of the auxiliary prism and they are semi-reflective, the first light-input face being a face for input of light from the associated light source in the direction of the second input face and the second semi-reflective input face allowing reflection of the light transmitted via said first input face in the direction of said output face.

The first and second light sources are advantageously arranged in superposed parallel planes on either side of the auxiliary prism, parallel to the output-face plane of the main cuboid plate, each facing one respective input face from the first and the second input faces of the auxiliary prism.

According to another aspect, the input face associated with the daytime light source features a semi-reflective treatment configured to favour a transmission coefficient $T1$ over a reflection coefficient $R1$ of said face, where $R1+T1=100$, and the input face associated with the nighttime light source features a semi-reflective treatment configured to favour a reflection coefficient $R2$ over a transmission coefficient $T2$ of said face, where $R2+T2=100$.

In one variant, the auxiliary prism is a first auxiliary prism and a second auxiliary prism, which is identical in shape to the first, is joined thereto via the semi-reflective lateral face so as to form a cuboid shape in the continuation, in the longitudinal direction with respect to the guide, of the main plate.

According to one embodiment of the invention, the guide shape is produced as one part, by machining (polishing, etching) glass or moulding an optical plastic material.

According to another embodiment of the invention, the two right prisms of the guide are made from identical or compatible materials for assembly together by bonding.

According to another aspect of the invention, the filter for the diodes of the nighttime light source is a collective filter formed by depositing dielectric thin films on the associated lateral input face of the auxiliary prism.

BRIEF DESCRIPTION OF THE DRAWINGS

Other features, details and advantages of the invention will become apparent upon reading the following description provided with reference to the appended drawings by way of example, which show, respectively.

DETAILED DESCRIPTION

The various figures are represented in a three-dimensional coordinate system (x, y, z). The plane (x, y) corresponds to the plane of the light-diffusion surface of the guide (or output face) which is located in a plane parallel to and below the liquid-crystal matrix array to be lit. The axis z runs perpendicular to the plane (x, y).

A lighting device according to the invention suitable for backlighting a liquid-crystal matrix array of a flat screen for viewing in daytime mode or in nighttime mode with NVIS compatibility uses a light guide which is arranged together with daytime and nighttime light sources for illuminating the entire back face of the matrix array with the light corresponding to the active (day- or night-) vision mode as uniformly as possible and with the least possible loss of luminance in the light guide. Unless specified otherwise, the light sources used are conventional light sources, formed by at least one row of light-emitting diodes which are arranged regularly over a carrier board and which emit in a direction orthogonal to the plane of the carrier board (upwards emission). These are for example white or coloured diodes for the daytime source, white diodes with NVIS filtering for the nighttime source, or coloured, RGB diodes with NVIS filtering associated with the red diodes.

The figures presented to aid in understanding the invention are only indicative of the general arrangement and shapes of the various elements of a lighting device according to the invention. These figures do not take the actual respective dimensions of the various elements into account. Likewise, from one figure to the next, there may also be changes in scale for one or all of the elements.

Figure 1:
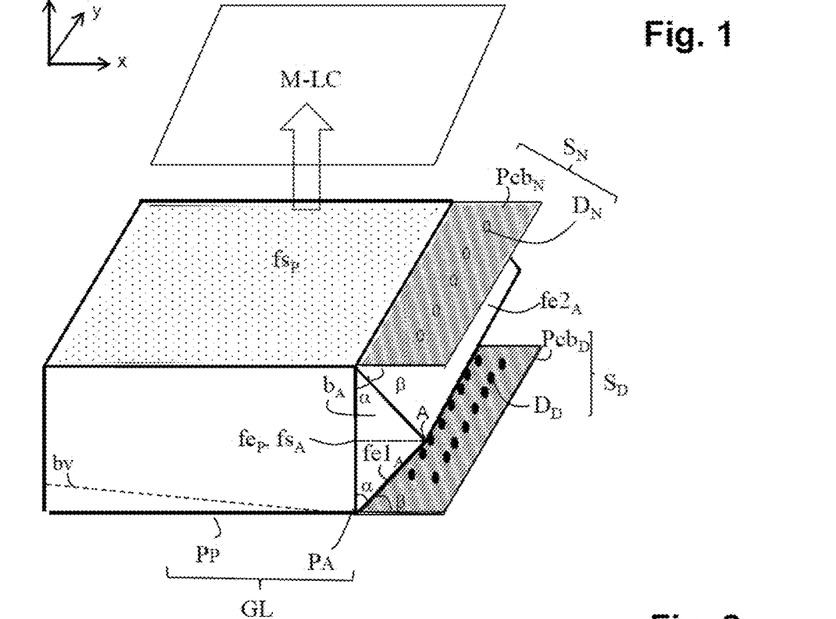
FIG. 1, is a perspective view of a lighting device according to the invention according to a first arrangement of a light guide according to one embodiment of the invention and daytime and nighttime light sources for backlighting a liquid-crystal matrix array of a flat viewing screen.

A light guide according to the invention is illustrated in FIG. 1. An LC matrix array is symbolically represented in the figure by a rectangular surface M-LC in order to illustrate the function of the light guide, which is to diffuse light via an outer face $fs_P$ which is located below the back face of this matrix array. The rectangular dimensions of this output face are at least equal to, and generally larger than, those of the matrix array so as to ensure that the entire back face of the LC matrix array is illuminated.

This output face $fs_P$ corresponds to the rectangular base of a cuboid shape $P_P$ (right rectangular prism). This cuboid plate $P_P$ forms the main portion of a light guide according to the invention, and its shape and its dimensions correspond to those of the backlight light guides of the prior art. The bases of the cuboid plate $P_P$, one of which forms the output face $fs_P$ of the guide, are in superposed parallel planes (x, y) below the LC-matrix-array plane. The cuboid plate also has four lateral faces.

In the invention, a single lateral face of the cuboid plate, denoted by $fe_P$, is used as the input face for light for extraction and diffusion via the output face $fs_P$ of the cuboid plate. The three other lateral faces and the bottom base of the cuboid plate are reflective (polished glass for example) and the top base, which is the output face, is a diffusing face (matte glass for example). The cuboid plate is advantageously designed to allow optimal light extraction in the direction of the diffusing output face $fs_P$, which is highly uniform over the entire length L of the plate (axis x). This may be achieved using light-guide technology that allows scattering particles to be incorporated within the bulk. However, the diffusion obtained with lateral injection is generally not optimal. Preferably, a plate designed to exhibit a light extraction gradient along the longitudinal direction x of the plate, corresponding to the direction of lateral injection of light from the input face $fe_P$ to the opposite face, is used. For example, the plate comprises microstructures formed by means of surface treatment (of the lower face and the/or upper face) or else within the bulk, and the size of the microstructures and/or the spacing between them varies so as to obtain the desired extraction gradient along the direction of injection. The function of these microstructures is to interrupt the geometry or the air/transparent-material interface of the plate. The microstructures may for example (and nonexhaustively) be microstrips that are oriented orthogonally with respect to the direction of light injection and get closer together the further they are from the lateral input face, microdots deposited by screenprinting diffusing paint on the back face, surface microholes (or bumps) or microprisms on the front face. In this case, the gradient function is synthesized by the variations in size and/or position of the microstructures. It is also possible to produce an extraction gradient by varying the thickness of the plate along its length. For example, the back face of the plate may be cut to a taper (which option is represented in FIG. 1 by the dashed line bearing the reference by). In this case, the height of the main lateral input face, used for injection, is the initial plate height h, and this height decreases gradually with increasing proximity to the opposite lateral face. It is also possible to combine a variation in thickness over the length of the plate with microstructures.

According to the invention, this main right prism, denoted by $P_P$, is extended from one of its lateral faces and in a direction orthogonal to this lateral face by an auxiliary right prism shape $P_A$, the base of which is an isosceles right triangle. Thus, in a longitudinal direction of the guide, there are two prisms set end to end: the main cuboid plate, which provides the output surface $fs_P$ for the light guide for diffusing light, and the auxiliary right triangular prism $P_A$ which serves as the input stage for the light guide for each of the two, daytime and nighttime, backlight sources. This input stage $P_A$ is thus located on an edge of the cuboid plate (and hence of the matrix array).

The base of the auxiliary right prism, denoted by $P_A$, takes the general shape of an isosceles right triangle. It therefore has three rectangular lateral faces and two of its lateral faces are in principle at right angles; it is for these that a short side of their rectangular shape corresponds to one of the two equal sides of the base shape that are at right angles, and the third face is that for which the short side of its rectangle shape corresponds to the hypotenuse.

In the invention, these three lateral faces of the auxiliary prism $P_A$ are such that one lateral face is an output face $fs_A$ of the auxiliary prism and it has the same rectangular dimensions as a lateral face of the main prism $P_P$ to which it is bonded or with which it is coincident, which forms the main input face $fe_P$ of the main prism $P_P$. The output face $fs_A$ of the input stage $P_A$ and the input face $fe_P$ of the main portion $P_P$ are coincident when the light guide is formed as one part: by moulding if the guide is made of optical plastic (PMMA, polycarbonate, silicone, etc.) or by machining (etching, polishing) if the guide is made of glass. Otherwise the two right prisms $P_A$ and $P_P$ are formed separately then joined by these two faces $fe_P$ and $fs_A$ by optical bonding. In this case, both portions are preferably made of the same optical material (glass or optical plastic).

the two other lateral faces form the light-input faces of the auxiliary prism $P_A$, each being associated with a respective light source.

In the figures, by way of nonlimiting example, the input face denoted by $fe1_A$ is that associated with the daytime light source and the input face denoted by $fe1_B$ is that associated with the nighttime light source.

In the invention, at least one of the input faces of the auxiliary prism is semi-reflective so as to allow injection of the radiation from each light source via a respective auxiliary input face (of the input stage) but via the same main input face of the light guide. In this way, it is possible to extract light in the direction of the output face $fs_P$ of the guide with the same level of efficiency whichever light source is active in order to ensure optimal backlighting with a high level of uniformity both in night-vision mode and in day-vision mode.

The specific features of the input stage of the guide according to the invention will now be described in detail in two embodiments of the light guide according to the invention with respective arrangements of the light sources.

Hereinafter, what is considered are light sources which are each made up of at least one row of light-emitting diodes that emit in a direction orthogonal to the source-carrier plane.

Figure 2:
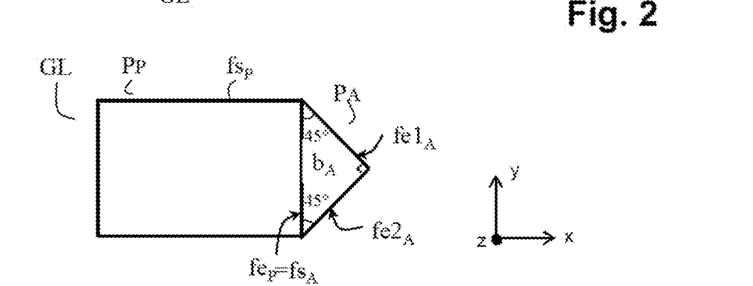
FIG. 2, a schematic sectional view of the general shape of the prismatic light guide of FIG. 1.
Figure 3:
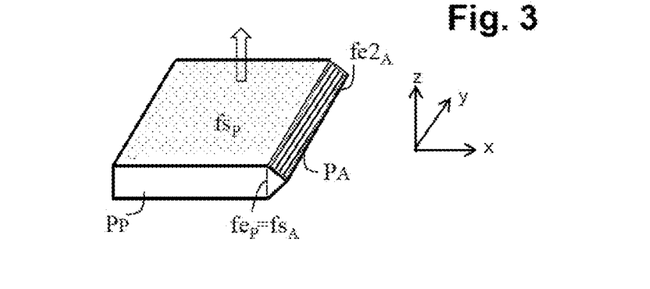
FIG. 3, a schematic perspective view of the light guide only.

FIGS. 1 to 3 show a first embodiment of the light guide according to the invention. It has been seen that the base $b_A$ of the auxiliary right prism $P_A$ takes the shape of an isosceles right triangle: the angle at the vertex A of the isosceles right triangle is a right angle and the two sides of equal length form an angle of 45 degrees with the hypotenuse. In practice, the measured angle values may be equal or close to 45 degrees without departing from the scope of the invention. In particular, adjustments by a few degrees may allow the transmission/reflection characteristics to be optimized with a view to obtaining the most uniform possible distribution of light over the main input face in each mode.

In this first embodiment, the two input faces $fe1_A$ and $fe2_A$ are formed by the two lateral faces at right angles, and these two faces are semi-reflective. The lateral output face $fs_A$ is thus formed by the lateral face of the prism which corresponds to the hypotenuse, and this face is bonded to or coincident with the lateral input face $fe_P$ of the main plate $P_P$. In principle, the two faces $fe_P$ and $fs_A$ have the same rectangular area dimensions.

FIG. 2 is a zx-sectional view in the plane of the base $b_A$ of the auxiliary prism $P_A$ of the light guide thus formed of the two, main $P_P$ and auxiliary $P_A$, prisms end-to-end in a longitudinal direction (x). FIG. 3, which is a perspective view of the guide, shows a corresponding monolithic shape: the output face $fs_P$ is in a plane x, y and the two lateral light-input faces $fe1_A$ and $fe2_A$ are, by construction, each in planes that are inclined at 45 degrees with the output face $fs_P$ or the opposite face.

In this embodiment, the light sources, including daytime sources ($S_D$) having light-emitting diodes ($D_D$) and nighttime sources ($S_N$) having light-emitting diodes ($D_N$) are arranged on superposed parallel planes (represented by the plane of their respective carrier board $Pcb_N$ and $Pcb_D$) on either side of the auxiliary prism, parallel to the plane of the main output face $fs_P$ of the guide. They are therefore each at right angles with the lateral output face of the auxiliary prism, and each form an angle θ with the respective auxiliary input face which, by construction, is equal to the angle α between this input face and the auxiliary output face $fs_A$, i.e. 45 degrees.

In this example, the nighttime light source is associated with the input face $fe2_A$ and they are placed on the output-face $fs_P$ (top-base) side of the main plate $P_P$, and the daytime light source is associated with the input face $fe1_A$ and they are located on the other (bottom-base) side of the main plate $P_P$. However, it would be just as possible for the arrangement to be inverted.

Furthermore, as has been seen in this embodiment, the two input faces $fe1_A$ and $fe2_A$ of the auxiliary prism are each semi-reflective. The semi-reflective treatment of these lateral input faces is defined so as to allow maximum transmission of luminous power at the input $fe_P$ of the main plate $P_P$ for the daytime mode. In the configuration of the figures, the input face $fe1_A$ associated with the nighttime source $S_N$ features a high transmission coefficient T1 and a low reflection coefficient R1 (R1+T1=100%). Furthermore, the lateral input face $fe2_A$ associated with the daytime source conversely features a high transmission coefficient T2 and a low reflection coefficient R2 (R2+T2=100%). For the daytime radiation, the transmission coefficient T1 for the face $fe1_A$ must be high, at least 90%, and the reflection coefficient R2 for the other face $fe2_A$ must also be high, at least 90%. As a consequence of the high values of T1 and R2, the radiation delivered by the nighttime source $S_N$ will conversely be heavily attenuated: through the associated lateral face $fe2_A$, which therefore features a low transmission coefficient T2, at most 10% (100 minus R2), then through the low degree of reflection R1 off the other lateral face, at most 10% (100 minus T1). This heavy attenuation of the power of the nighttime radiation is balanced/adjusted using the number of diodes of the nighttime source in order to obtain the required power level, which is naturally low. It is here possible to take advantage of the fact that the "nighttime" diodes may be aligned along the entire length (along y) of the main input face (=auxiliary output face).

By way of indication, the thickness (or height) h of the plate $P_P$ (thin layer) is generally of a few millimetres (3 or 4 millimetres for example) and the length of the lateral input face, which depends on the area of the matrix array M-LC to be backlit, may range from a few centimetres for small matrix arrays to several tens of centimetres for the largest.

Figure 4:
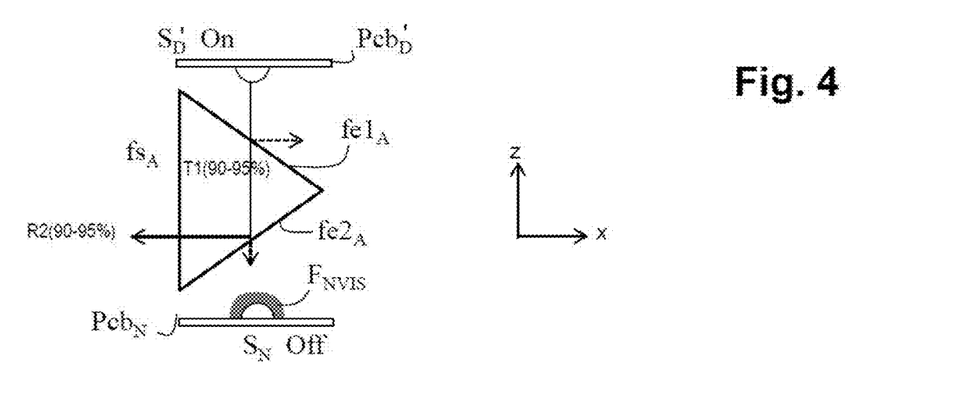
FIGS. 4 and 5, diagrams showing the optical path through the input stage of the guide for the radiation from the daytime light source (FIG. 4) and from the nighttime light source (FIG. 5)
Figure 5:
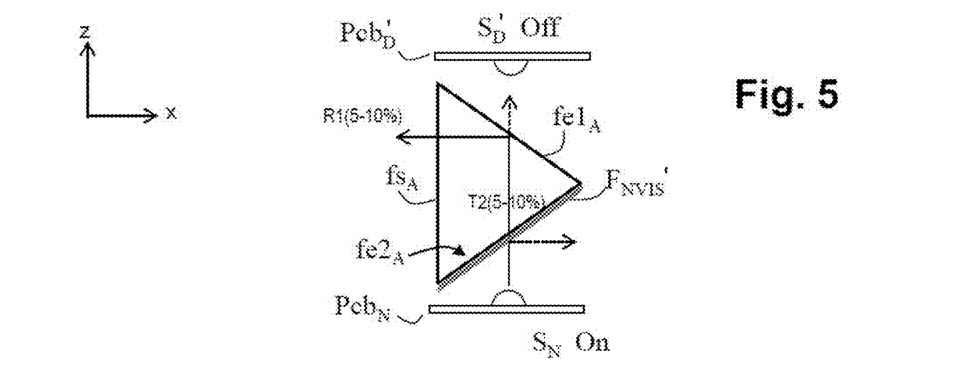

The optical paths for the daytime and nighttime radiation through an auxiliary prism according to the invention which serves as input stage for the light guide are schematically illustrated in FIGS. 4 and 5. FIG. 4 corresponds to the day-vision mode: the daytime source is active ($S_D$' On) and the nighttime source is inactive ($S_N$ off). The daytime source lies in a plane $Pcb_D$' inclined at 45 degrees with the respective lateral input face $fe1_A$: a major portion T1 of the daytime radiation is transmitted via this face $fe1_A$ in the direction of the lateral input face $fe2_A$, which reflects a major portion R2 thereof in the direction of the auxiliary-output lateral face $fs_A$. FIG. 5 corresponds to the night-vision mode: the nighttime source is active ($S_N$ On) and the daytime source is inactive ($S_D$' Off). The nighttime source lies in a plane $Pcb_N$ inclined at 45 degrees with the respective input face $fe2_A$: a small portion T2 of the nighttime radiation is transmitted via this face $fe2_A$ in the direction of the lateral input face $fe1_A$, which reflects a small portion R1 thereof in the direction of the auxiliary-output lateral face $fs_A$.

Figure 6:
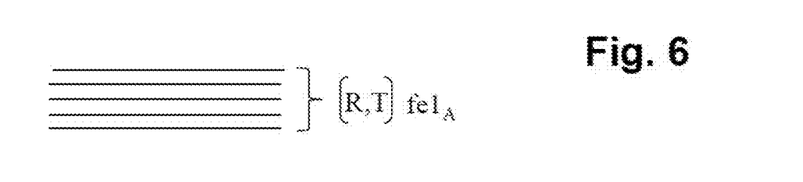
FIGS. 6 and 7, a schematic representation of the stacks of thin films on the lateral light-input faces of the input stage of the light guide, which provide the semi-reflective and/or the NVIS-filtering characteristics of the light-input faces of the input stage of the guide.

The semi-reflective coating of the input faces of the auxiliary prism is produced by means of any known prior-art technique. It may in particular consist of a deposition of metal or dielectric thin films which is suitable for providing the desired reflection/transmission [R, T] levels, as illustrated schematically in FIGS. 6 and 7. It may also be obtained by bonding, to the respective face, an optical film exhibiting the desired reflection/transmission [R, T] properties.

Figure 7:
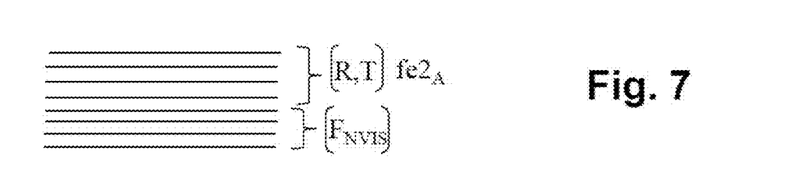

Regarding the NVIS filter, denoted by $F_{NVIS}$ or $F_{NVIS}$' in the figures, which is a filter for cutting out those wavelengths in the red and infrared, it may be individual for each diode, in which case it takes, as known, the form of a cover, as schematically illustrated in FIGS. 4 and 5, or collective, in which case it takes the form of a deposition of dielectric thin films performing the desired function, or the deposition of an optical filter performing the NVIS-filtering function, over the semi-reflective treatment [R, T] of the input face $fe2_A$ associated with the nighttime source, as illustrated in FIG. 7. This collective-filter configuration is less expensive and also makes it possible to decrease the constraints in terms of spacing between the diodes on the nighttime-source carrier circuit board.

Lastly, it will be specified that just as the angles between the faces of the auxiliary prism could take values that are not strictly equal to those given, the measurements of the various angles between the planes of the sources and of the various portions of the guide could also not be strictly equal to the values given. In particular, it is necessary to account for the tolerances in the mechanical assembly of the guide and light sources. Such variations are covered by the invention. Also, in the figures, the nighttime light source ($S_N$) is located on the same side as the main output face ($fs_P$) of the guide. However, it would be just as possible to place the daytime source on this side, without departing from the scope of the invention.

Figure 8:
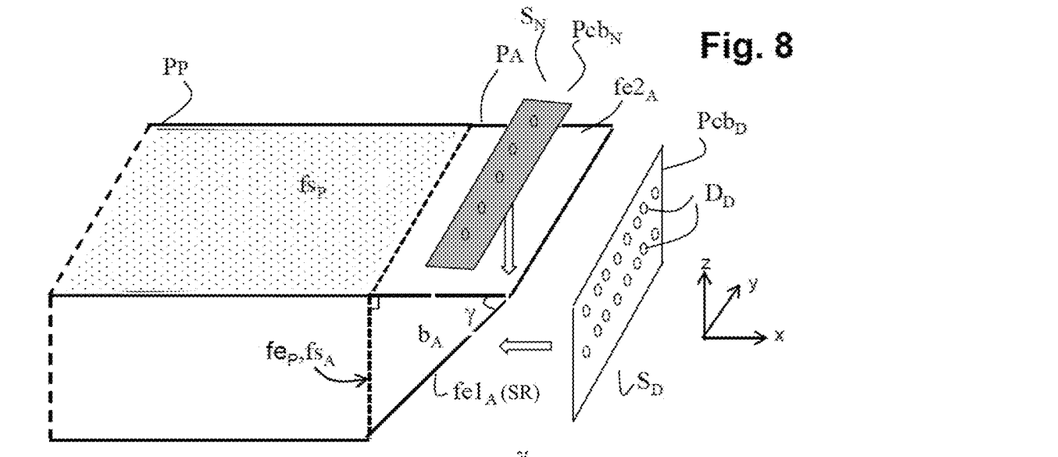
FIG. 8, a schematic view from above of the general shape of a prismatic light guide with an input stage according to a second embodiment of the invention and of the arrangement of the two backlight sources relative to this input stage.
Figure 9:
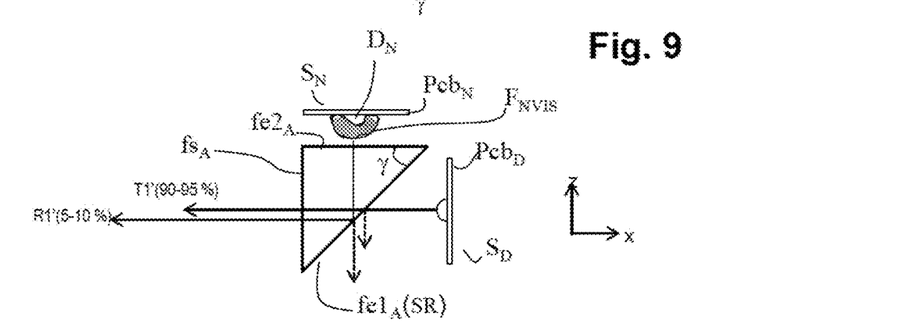
FIG. 9, a diagram showing the optical path through the input stage of the guide of FIG. 8 for the daytime and nighttime radiation, respectively.

A second embodiment of the invention is illustrated in FIGS. 8 and 9. In this embodiment, the two lateral faces of the auxiliary prism which are at right angles, corresponding to the two equal sides of the isosceles-right-triangle shape of the base of this prism, form a first auxiliary-input face $fe2_A$ in the case of one in this example and the auxiliary output face $fs_A$ in the case of the other in this example. The second auxiliary-input face, $fe1_A$ (SR) in the example, is formed by the lateral face of the prism which corresponds to the hypotenuse of the base triangle: in this embodiment, the two auxiliary input faces $fe1_A$ (SR) and $fe2_A$ form an angle γ of 45° and only the input face feta receives a semi-reflective treatment [R, T].

Returning to the illustrated example in which the daytime source is associated with the face $fe1_A$ and the nighttime source is associated with the face fe2, the arrangement of the sources with respect to the auxiliary prism, which serves as input stage for the light guide, is then as follows: the nighttime source and the respective input face $fe2_A$ are placed in superposed parallel planes, parallel to the output-face plane $fs_P$ of the main plate. The daytime source and the auxiliary-output face $fs_A$ are in superposed parallel planes on either side of the lateral input face $fe1_A$.

In this case, the lateral input face $fe2_A$ associated with the nighttime source does not receive the semi-reflective treatment; instead it may include a multilayer treatment (stack of thin films) in order to perform a collective optical-filter function $F_{NVIS}$ (for all of the diodes of the nighttime source) as explained with reference to FIG. 7. Such a collective filter allows the diodes of the nighttime source to be placed closer together since they are no longer fitted with an individual NVIS-filtering cover.

FIG. 9 schematically illustrates, for this second embodiment, the optical paths and the application of the reflection R1' and transmission T1' levels of the input face $fe1_A$ (SR) which allow light to be injected with power matched to the active source: maximum for the daytime radiation, with a coefficient T2' of at least 90%, and then heavily attenuated, by a factor R1' (100 minus T1'—hence at most 10%) for the nighttime radiation. When it is the nighttime source $S_N$, the radiation emitted by the diodes and filtered ($F_{NVIS}$) either individually (FIG. 9) or collectively (FIG. 7) is transmitted losslessly via the lateral face $fe2_A$ (which is in a plane orthogonal to the direction of the radiation) into the interior of the auxiliary prism in the direction of the other input face $fe1_A$ (SR) which reflects only the small proportion R1' thereof in the direction of the output face $fs_A$. When it is the daytime source $S_D$, the majority of the radiation emitted by the diodes is transmitted via the semi-reflective lateral face $fe1_A$ (SR) (transmission coefficient T1') in the direction of the output face $fs_A$. In practice, T1' is preferably chosen to be between 90 and 95%.

It would be possible to invert the position of the light sources and associate the daytime source with the input face $fe2_A$ and the nighttime source with the face $fe1_A$ (SR): then it would be T1' which would be low, at most 10%, and R1' which would be high, at least 90%.

All that has been stated regarding forming the light guide according to the invention in two portions that are assembled together by bonding or in a single part by machining or moulding, regarding the angle values in the prism or between the various elements of the assembly which may deviate from the theoretical values for the sake of optimizing the reflection/transmission characteristics or because of tolerances in manufacturing processes or mechanical-assembly tolerances, or regarding adjusting the number of diodes according to reflection/transmission losses in order to obtain the desired power, applies to this second embodiment.

In general, the sources will be arranged centred in relation to their respective input face so as to capture as much radiation as possible (divergence of the diodes). As seen above, the number of diodes in each row (or the number of rows) will be adjusted for each source in relation to the reflection and transmission coefficients that apply, respectively, to obtain the necessary power at the main input $fe_P$ for each vision mode.

Additionally, well-known techniques for current-controlling each diode individually (local dimming) may be applied to a lighting device incorporating a light guide according to the invention.

Lastly, a lighting device incorporating a light guide according to the invention is suitable, as seen, for light-emitting-diode-based light sources, which may be white diodes but also coloured light-emitting diodes, typically red, green and blue diodes, (with filters on the red diodes for the nighttime source), etc.

Figure 10:
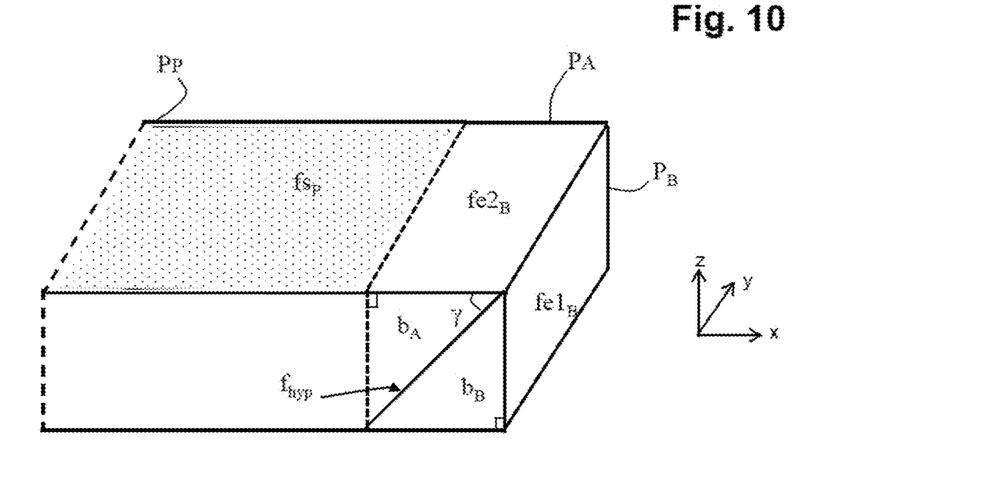
FIG. 10, a general perspective view of this guide according to one variant implementation of the second embodiment.

FIG. 10 illustrates one variant applicable to the second embodiment, the advantage of which is to provide the light guide with a final general elongate-cuboid shape, which may simplify handling and assembly of the guide and mechanical assembly together with the light sources. In this variant, a third right prism $P_B$, identical in shape to the auxiliary prism $P_A$, is provided and the two prisms $P_A$ and $P_B$ are assembled together via their diagonal faces $f_{hyp}$ to form a cuboid. The two bases $b_A$ and $b_B$ thus joined together form a square.

The advantages of an NVIS-compatible lighting device according to the invention with two, daytime and nighttime, modes are to make it possible, in a straightforward and inexpensive manner using a light guide with an input stage according to the invention, to provide a high degree of backlighting uniformity in each mode with a power level matched to each mode, in a configuration which favours, by construction, transmission over the daytime path, which is the one that requires the most power, while keeping bulk low by virtue of lateral injection via the same input face. In particular, it could be verified that at least 81% of the light from the daytime source is transmitted by the input stage $P_A$ into the main plate $P_P$. The guide is compatible with gradient-structuring techniques of the prior art applied to the main plate allowing both extraction (overall backlight efficiency) and uniformity of extraction to be maximized.

An NVIS-compatible lighting device with two, day- and night-, vision modes according to the invention also provides a high degree of compactness. In particular, the thickness of the assembly of one or more auxiliary prisms and sources does not differ substantially from the thickness of the main plate; mechanical integration is facilitated, including in terms of heat management and connections (to other boards).

All of these advantages contribute to decreasing the overall cost for producing the guide and incorporating the sources to form the lighting device.

The invention claimed is:

1. A lighting device comprising:
a first light source configured for a day-vision mode, having at least one first row of light-emitting diodes arranged on a first carrier and configured for emitting light in a first direction orthogonal to the first carrier;
a second light source configured for a night-vision mode, having at least one second row of light-emitting diodes arranged on a second carrier and configured for emitting light in a second direction orthogonal to a second carrier, and an optical filter configured for modifying the light emitted by said second row of light emitting diodes compatible with the use of night-vision equipment; and
a cuboid-shaped light guide having a main output face and lateral light-injection face; and
an auxiliary right prism right shaped as an isosceles right triangle, with a three rectangular lateral faces, two of said rectangular lateral faces at a right angle to one another
wherein a first one of the rectangular lateral faces is a first light input face receiving light from the first light source; a second of the rectangular lateral faces is a second light input face receiving light from the second light source; and a third of the rectangular lateral faces is a light output face facing the lateral light-injection face and has the same rectangular dimensions as the lateral light-injection face,
wherein said first light input face is semi-reflective for reflecting light received by the second light input face towards the light output face, and light from the first and second light sources is redirected by the auxiliary right prism towards the lateral light-injection face of the light guide to be diffused and outputted through the main output face.

2. The lighting device according to claim 1, wherein the second light source lies in a plane parallel to and on the same side as the main output face of the light guide.

3. The lighting device according to claim 1, wherein the auxiliary right prism is joined to the light guide plate by bonding.

4. The lighting device according to claim 1, wherein the light guide plate and the auxiliary right prism form a monolithic optical part obtained by molding or machining.

5. The lighting device according to claim 1, wherein a semi-reflective treatment of the first light input face comprises an operation of surface-depositing metal or dielectric thin films.

6. The lighting device according to claim 1, wherein the optical filter of the second light source covers all of the diodes of the second light source, and a dielectric thin-film structure surface-deposited on the second light input face of the auxiliary right prism.

7. The lighting device according to claim 1, wherein said two rectangular lateral faces at right angle to one another correspond to the first light input face and the second light input face of the auxiliary prism, and the second light input face is semi-reflective for reflecting light received by said first input face towards said light output face.

8. The lighting device according to claim 7, the first and second light sources being arranged in parallel planes on either side of the auxiliary prism, and parallel to the main output face, each facing one respective input face from the first and the second input faces of the auxiliary right prism.

9. The lighting device according to claim 7, wherein the first light input face features a semi-reflective treatment configured to favor a transmission coefficient T1 over a reflection coefficient R1 of said face, where R1+T1=100, and the second light input face includes a semi-reflective treatment configured to favor a reflection coefficient R2 over a transmission coefficient T2 of said face, where R2+T2=100.

10. The lighting device according to claim 9, wherein T1 and R2 are each at least equal to 90%.

11. The lighting device according to claim 1, wherein said two rectangular lateral faces at right angle to one another of the auxiliary right prism correspond to the light output face and the second light input face of the auxiliary right prism.

12. The lighting device according to claim 11, further comprising a complementary right prism, the shape of which is identical to that of the auxiliary right prism, the two prisms being joined together so as to form a cuboid.

13. The lighting device according to claim 11, wherein the first and second light sources are arranged in planes at right angles, the second light source arranged parallel to said second light input face, the first light source arranged parallel to said light output face of the auxiliary right prism, with the first light input face arranged between said first light source and said light output face.

14. The lighting device according to claim 13, wherein the first light input face includes a semi-reflective treatment configured to favor a transmission coefficient T1 over a reflection coefficient R1 of said face, where R1+T1=100.

* * * * *